April 22, 1958     K. M. GAVER ET AL     2,831,889

PROCESS OF PREPARING GLUTAMIC ACID

Filed May 14, 1954

INVENTORS
KENNETH M. GAVER
ALFRED M. BARTON
ALLAN A. EISENBRAUN
BY
*Jerome R. Cox*
ATTORNEY

United States Patent Office 2,831,889
Patented Apr. 22, 1958

2,831,889

PROCESS OF PREPARING GLUTAMIC ACID

Kenneth M. Gaver, St. Lambert, and Alfred M. Barton and Allan A. Eisenbraun, Montreal, Quebec, Canada, assignors to The Ogilvie Flour Mills Co., Ltd., Montreal, Quebec, Canada, a corporation of Quebec Application May 14, 1954, Serial No. 429,919

6 Claims. (Cl. 260—529)

The invention disclosed in this application relates to improvements in processes for the preparation of glutamic acid and other amino acids whose separation and purification might be impeded by the presence of alcohol extractable substances from proteins. It is illustrated by improved processes for the preparation of glutamic acid and ultimately monosodium glutamate from wheat gluten derived from wheat flour (i. e. milled wheat from which wheat germ and bran has been removed by bolting).

Figure 2:
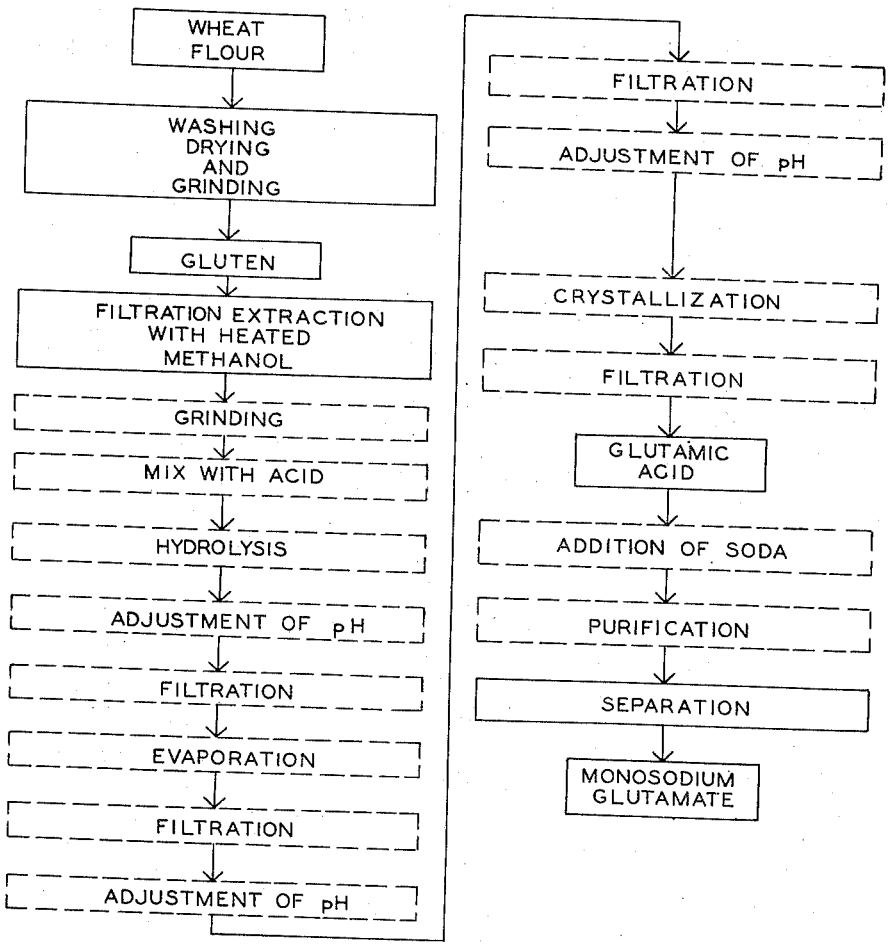

One process by which wheat gluten has heretofore been obtained from wheat flour consists of a process in which the flour is mixed into a dough and kneaded with water or into a batter and washed with water so that the starch and other carbohydrates are removed therefrom, and then as indicated by the dotted portion of Fig. 2, the gluten so obtained is hydrolyzed with acid treated with alkali and filtered to remove humins and other impurities. Then some amino acids other than glutamic acid are removed by suitable adjustment of the pH and filtration and finally glutamic acid is similarly removed by adjustment of the pH, crystallization, and further filtration.

We have discovered that by grinding dried protein materials, filtration extraction of lipins (i. e. fats and lipoids) from the protein (e. g. wheat gluten) with a substantially anhydrous lower alcohol such as methyl, ethyl, the propyl and the butyl alcohols, preferably in the presence of heat prior to the beginning of one of the known processes of separation of the one or more of the commercially valuable amino acids, such as for example, glutamic acid (as for example by the steps explained below), we can improve materially the efficiency of the separating process and also improve materially the product obtainable.

One of the objects of our invention is the improvement of processes of obtaining glutamic acid and other amino acids from protein materials.

A further object of our invention is the provision of a continuous process of extraction of lipins from protein materials by means of a heated substantially anhydrous alcohol which results in (a) a facilitated mixing operation, (b) an improved facilitated hydrolysis, (c) an improved and facilitated filtration of humins, (d) less product waste because of a reduction in the amount of humins produced during hydrolysis, (e) improved crystallization rate of amino acids, (f) improved crystallization rate of the end product, (g) improved storeability of the end product, (h) a more easily decolorized liquid system, (i) improved purification and decolorization of the end product liquors, (j) facilitation of all stages of the operation and (k) a marked reduction in odoriferous substances.

As applied to the securing of glutamic acid and monosodium glutamate from wheat gluten it is a specific object of our invention to achieve the above general objects and especially to obtain an improved crystallization rate of glutamic acid, and of monosodium glutamate and improved purification and decolorization of glutamic acid.

A further object is the improvement of processes of obtaining monosodium glutamate and other useful salts of amino acids.

A further more specific object of our invention is the provision of such a process utilizing methanol at or near its boiling point.

A further object of the invention is the recovery of by-products extracted by substantially anhydrous alcohol from the wheat gluten.

A further object is the production of an improved monosodium glutamate.

Further objects and features of the invention will be apparent from the subjoined specification and claims when considered in connection with the accompanying drawings illustrating our invention and one embodiment thereof.

Figure 1:
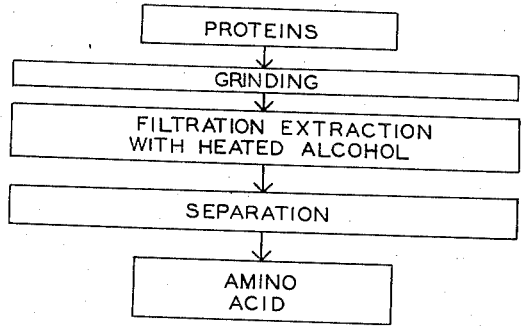

In the drawings:

Fig. 1 is a flow sheet showing the principal steps of a process developed according to our invention; and Fig. 2 is a flow sheet showing somewhat in detail a process for the manufacture of monosodium glutamate from milled and bolted wheat flour according to one embodiment of our invention.

It is well known in the art that impurities including lipins, such as, for example, lipoids, fatty acids and other fats normally exist in gluten and in other proteins. We have discovered that these impurities existing in gluten and in other proteins interfere with the process of separation of amino acids from such gluten and other proteins. This interference is especially important in connection with certain steps of the separation process as will be pointed out more clearly below. We have discovered that if these lipins are removed prior to the step of hydrolysis for separation of the glutamic acid and other amino acids, the process is materially improved and facilitated.

Referring to Fig. 1, it may be seen that while our invention relates broadly to the separation of amino acids, from proteins, we have illustrated it in connection with the preparation of glutamic acid from gluten. In carrying out this illustration of our invention, we grind the gluten and then extract (by filtration with heated alcohol) certain impurities in the gluten before breaking down the gluten into its constituent parts and separating out the glutamic acid.

In Fig. 2, we show a more specific embodiment of our invention. Therein optional steps and an illustrative known commercial method of separating glutamic acid from gluten are shown by boxes having dotted outlines. If the handling of the gluten is continuous, the grinding after the methanolic extraction step is not necessary, but if the gluten is allowed to remain quiescent after the extraction step the particles may agglomerate and regrinding may be necessary.

The method of breaking the protein down into its constituent parts and separating out the glutamic or other amino acid may however be any suitable method. One customary method of treating wheat gluten comprises the following 14 steps:

(1) *Mixing of the component parts of the hydrolysis mixture.*—Generally the gluten is mixed with strong hydrochloric acid with or without additional water.

(2) *Hydrolysis of the gluten.*—The mixture of gluten and acid is heated, generally under pressure, and thereby the gluten is broken down with the addition of water to the molecule to form amino acids. Thereafter the excess hydrochloric acid, above that needed for hydrolysis, forms the hydrochlorides of the amino acids to prevent their reassociation into peptides under the influence of heat and pressure.

(3) *Adjustment of pH.*—In the strongly acid solution some of the impurities which it is desirable to remove from the solution exist also as soluble hydrochlorides, and so it is desirable to partially neutralize the solution with caustic soda or other suitable alkali so that these soluble substances are precipitated.

(4) *Filtration of humins.*—The humins represent the degradation products of the hydrolysis, interaction products between proteins, peptides and amino acids with impurities existent in the original protein, and finally some acid resistant impurities.

(5) *Evaporation.*—The filtrate from the humins is evaporated to such an extent that the majority of the salt arising from step 3 above, crystallizes out of solution.

(6) *Filtration.*—The crystallized salt is then removed by appropriate filtration.

(7) *Adjustment of pH.*—The filtrate is then adjusted to the pH at which tyrosine, leucine, and isoleucine as well as various other coprecipitating amino acids are least soluble and the filtrate is held at this point until these amino acids precipitate.

(8) *Filtration.*—The precipitated amino acids are removed by appropriate filtration since their presence in the system would interfere with the separation of glutamic acid.

(9) *Adjustment of pH.*—The filtrate is then adjusted to the isoelectric point (equal charge intensity of basic and acidic groups) of glutamic acid.

(10) *Crystallization of glutamic acid.*—The glutamic acid is allowed to crystallize, usually with the aid of refrigeration, the other amino acids remaining in solution.

(11) *Filtration.*—The separated glutamic acid is then filtered off from the mother liquor which may or may not be reworked to recover the last possible quantities of glutamic acid.

(12) *Conversion into monosodium glutamate.*—The crude glutamic acid is suspended in clean water and one of the two carboxyls is neutralized with caustic soda to form monosodium glutamate.

(13) *Purification of monosodium glutamate liquor.*— The solution of monosodium glutamate is decolorized and filtered by appropriate means.

(14) *Separation of monosodium glutamate.*—The purified monosodium glutamate solutions are crystallized, the crystals separated, dried, and packed.

As we suggested above, we have discovered that the lipins and other impurities normally existent in gluten or other proteins interfere with the above outlined process, especially in connection with steps 1, 2, 4, 6; the precipitation in steps 7, 8, 10, 13, and 14; the filtration in step 11; and also in the storage stability of monosodium glutamate. The impurities most generally encountered are fats and carbohydrates. The carbohydrates can only be removed by proper purification while still in the wet state, but they can easily be removed by kneading and washing of the gluten with water. The carbohydrates may be reduced by this operation. Not all of the carbohydrate is usually removed in ordinary commercial practice, inasmuch as an economic balance is encountered. This economic balance is at approximately 80% protein in the case of wheat gluten. The lipins of the wheat gluten are not so easily separated. Once the gluten is wet with water during the carbohydrate washing step, the fat is tenaciously held. We have discovered that it is desirable to separate the fat from the washed, cooked, and dried gluten. Herein lies one process which is unique in this application. Ordinary wheat gluten contains between 10 and 12% fat. The fat exists in two forms in that about a third of it is tied up in the gluten itself, probably as "lipo-proteins" and can only be recovered by extensive hydrolysis. We have found, however, that the fat which is included in the protein constitution does not interfere greatly with the process of separating the glutamic acid but that the other (i. e. extraneous fat) does. Thus we have discovered that the extraneous fat which comprises about 8% of the commercial gluten causes most of the undesirable effects in the processes for the separation of monosodium glutamate process.

It is our discovery that the pre-purification of the gluten from the lipins is most important in the subsequent process of breaking the gluten down into its constituent amino acids and separating out the glutamic acid. It appears that the extraneous fat should be able to be extracted by fat solvents. However, we have found that many of the ordinary fat solvents do not extract an appreciable amount of these extraneous fats or else they take out too much of the gluten itself. We found that trichlorethylene, diethylether, petroleum ether, benzene, chloroform and hexene were not satisfactory. We discovered, however, that heated anhydrous alcohols such as methyl, ethyl, the propyl, and the butyl alcohols were satisfactory and that anhydrous methanol used at or about its boiling point was extremely efficient in purifying the gluten so that the subsequent separation of the glutamic acid from the gluten was greatly expedited.

In following the commercial glutamic acid separation process illustrated in Fig. 2 and in the mixing step (step No. 1 above) we found for instance that where the impurities (which we assume to be mainly extraneous fats) in the gluten had been extracted by methanolic extraction, the gluten was quite readily wet by acid with no tendency to lump up. After standing over night, this mixture was light tan in color, contained no lumps and was clear. Nothing stuck to the flask other than a clean liquid film, and there was no sharp penetrating odor. The purified gluten, after hydrolysis, was darkly colored although very bright. No oily layer was evident on the surface, there was no tendency to stick the flask, and the humins were dispersed as uniform discreet pieces. With the extracted gluten, after purification as above outlined, in filtration step No. 4, the filtrate was considerably improved and relatively easy to wash. The dried humins amounted to 4.68% of the original gluten weight. The filtrate possessed no foreign or objectionable odor and no oil film was detected. In crystallization step No. 11, the glutamic acid started to crystallize immediately from the solution, much more quickly than where the gluten had not been purified according to our invention.

On the other hand, gluten which had not been purified by our process was not at all readily wet by hydrochloric acid and had some tendency to lump. After standing over night the mixture was very dark, contained many cheese-like lumps which readily stuck to the flask. The mixture possessed a sharp penetrating odor predominant over the acid odor. After hydrolysis the original unpurified gluten became very dark with excessive sticking to the walls of the flask. An oily layer was evident on top of the hydrolysate. The humins were aggregated in large greasy-like flocs. In filtration step No. 4 where the gluten had not been purified, the filtration was quite slow and the humins were hard to wash free of solubles. The dried humins amounted to 12.16% of the original gluten weight. The filtrates from step 4 still retained the sharp penetrating odor and had an oil film on top.

The monosodium glutamate produced by the two methods differed in that the monosodium glutamate from the extracted gluten was more easily purified and lacked the odor carried through so obviously in the monosodium glutamate from the original gluten.

We have found that it is important that the solvent be substantially anhydrous and that it be one of the lower alcohols such as methyl, ethyl, one of the propyl, or one of the butyl alcohols. The solvent is thus preferably an anhydrous straight chain alcohol (i. e. up to and including the $C_4$ alcohols) inasmuch as straight chain alcohols are superior. If an alcohol-water mixture such as, for example, a 50–80% ethanol solution is used, the gluten itself is partially dissolved and are thus lost. Therefore, we prefer substantially anhydrous alcohols and of these we prefer absolute methanol. It is chosen at least partly because of its general utility, inexpensiveness and ease of manipulation with respect to recovery, etc. Heat is necessary and when using methanol we prefer to use is at or near its boiling point (i. e. about 65° C.).

In the extraction step, the alcohol can be recycled 7 to 10 times before being processed for recovery of the fat. It is therefore economical and of utility to recycle the alcohol to successively fresher protein material and use fresh alcohol for the final wash of the purified protein material.

We have found that it is preferable that the gluten be in fine particles prior to the extraction step. We grind it at least small enough to pass through a 35-mesh screen and we prefer to grind it to a fineness in which it will pass through a 60-mesh screen.

Although it appears that our process is applicable to proteins of all kinds, yet we have experimented only with gluten and we know that it is critical in the separation of glutamic acid from gluten.

Just as it is important that no water be introduced in the solvent it is also important that the gluten before the extraction step be thoroughly dried after washing and cooking. It is also important that no water be introduced during the extraction step.

It is to be understood that the above described embodiment of our invention is for the purpose of illustration only and various changes may be made therein without departing from the spirit and scope of the invention.

We claim:

1. A process of producing a glutamic acid which comprises extracting extraneous lipins from gluten by grinding the gluten to a fineness at least small enough to pass through a 35-mesh screen, and then washing said ground gluten with a heated substantially anhydrous alcohol selected from the group consisting of methyl alcohol, ethyl alcohol, the propyl alcohols and the butyl alcohols and filtering; hydrolyzing; and thereafter separating the glutamic acid from the hydrolyzed products of the lipin extracted gluten.

2. A process of producing glutamic acid which comprises extracting extraneous lipins from wheat gluten by grinding the gluten to particles of a fineness at least small enough to pass through a 35-mesh screen, and then washing said ground wheat gluten with a substantially absolute alcohol selected from the group consisting of methyl alcohol, ethyl alcohol, the propyl alcohols and the butyl alcohols and filtering; hydrolyzing; and thereafter separating the glutamic acid from the hydrolyzed products of the lipin extracted wheat gluten.

3. The process of claim 2 in which the alcohol is anhydrous methyl alcohol.

4. A process of producing an amino acid which comprises extracting extraneous lipins from gluten by washing said gluten with a heated substantially absolute alcohol selected from the group consisting of methyl alcohol, ethyl alcohol, the propyl alcohols and the butyl alcohols and filtering; hydrolyzing; and thereafter separating the amino acid from the hydrolyzed products of the lipin extracted gluten.

5. The process of claim 4 in which the alcohol is anhydrous methyl alcohol.

6. The process of claim 4 in which the gluten is thoroughly dried prior to the extraction step.

References Cited in the file of this patent

UNITED STATES PATENTS

| Number | Name | Date |
|---|---|---|
| 713,395 | Carstairs | Nov. 11, 1902 |
| 1,890,590 | Sen | Dec. 13, 1932 |
| 1,992,804 | Bartow et al. | Feb. 26, 1935 |
| 2,141,455 | Weizmann | Dec. 27, 1938 |
| 2,313,504 | Balls et al. | Mar. 9, 1943 |
| 2,414,195 | Evans et al. | Jan. 14, 1947 |
| 2,593,487 | Royal | Apr. 22, 1952 |
| 2,648,704 | Ogawa et al. | Aug. 11, 1953 |

OTHER REFERENCES

Dill: Cereal Chemistry, vol. 2, pages 1 to 11 (1925).

Jones et al.: J. Biol. Chem., vol. 39, 429–440 (1928).

Tseng et al.: J. Chinese Chem. Soc., vol. 3, p. 160 (1935).

Anson et al.: Advances in Protein Chem., vol. 1, pp. 6, 9 and 20 (1944).

Anson et al.: Advances in Protein Chem., vol. 2, pp. 337–41 (1945).

U. S. DEPARTMENT OF COMMERCE
PATENT OFFICE

CERTIFICATE OF CORRECTION

Patent No. 2,831,889     Kenneth M. Gaver et al.     April 22, 1958

It is hereby certified that error appears in the printed specification of the above numbered patent requiring correction and that the said Letters Patent should read as corrected below.

Column 4, line 29, after "stick" insert -- to --.

Signed and sealed this 1st day of July 1958.

(SEAL)
Attest:
KARL H. AXLINE
Attesting Officer

ROBERT C. WATSON
Commissioner of Patents